(12) United States Patent
Pereira et al.

(10) Patent No.: US 10,337,565 B2
(45) Date of Patent: Jul. 2, 2019

(54) ZERO BACKLASH PRE-DAMPER TO MAIN DAMPER ATTACHMENT SYSTEM

(71) Applicant: Eaton Corporation, Cleveland, OH (US)

(72) Inventors: Luiz Filipe Silva Pereira, Indaiatuba (BR); Michael Lee Bassett, Auburn, IN (US)

(73) Assignee: Eaton Intelligent Power Limited, Dublin (IE)

( * ) Notice: Subject to any disclaimer, the term of this patent is extended or adjusted under 35 U.S.C. 154(b) by 268 days.

(21) Appl. No.: 15/364,918

(22) Filed: Nov. 30, 2016

(65) Prior Publication Data

US 2017/0152898 A1    Jun. 1, 2017

Related U.S. Application Data

(60) Provisional application No. 62/261,018, filed on Nov. 30, 2015, provisional application No. 62/414,815, filed on Oct. 31, 2016.

(51) Int. Cl.
| | |
|---|---|
| *F16F 15/123* | (2006.01) |
| *F16D 13/68* | (2006.01) |
| *F16D 13/58* | (2006.01) |
| *F16F 15/121* | (2006.01) |
| *F16D 13/64* | (2006.01) |

(52) U.S. Cl.
CPC ............. *F16D 13/58* (2013.01); *F16D 13/64* (2013.01); *F16F 15/1216* (2013.01); *F16D 13/68* (2013.01); *F16D 2300/22* (2013.01); *F16F 2236/08* (2013.01)

(58) Field of Classification Search
CPC .. F16F 15/1216; F16F 15/123; F16F 15/1203; F16F 15/12386; F16F 2236/08; F16D 13/64; F16D 13/68; F16D 2300/22
See application file for complete search history.

(56) References Cited

U.S. PATENT DOCUMENTS

| 5,366,057 A | 11/1994 | Despres et al. |
| 5,908,099 A | 6/1999 | Kleifges |

(Continued)

FOREIGN PATENT DOCUMENTS

| EP | 2607742 A1 | 6/2013 |
| WO | WO2014186650 A1 | 11/2014 |

*Primary Examiner* — Jacob S. Scott
*Assistant Examiner* — Lillian T Nguyen
(74) *Attorney, Agent, or Firm* — Mei & Mark, LLP

(57) ABSTRACT

A driven damper assembly, comprises a first main-damper cover plate comprising an inclined portion. The inclined portion comprises a notch. A first plane passes through the first pre-damper cover plate. A second plane passes through the first main-damper cover plate and is parallel to the first plane. The notch comprises a first wall and a second wall. The first wall is not parallel to the second wall. The inclined portion extends away from the second plane at an angle greater than zero degrees away from the second plane and less than ninety degrees away from the second plane. The first pre-damper cover plate comprises a tab with a first portion extending outwardly at an angle greater than zero degrees away from the first plane and less than ninety degrees away from the first plane, wherein the tab engages the notch at the first wall and the second wall.

22 Claims, 7 Drawing Sheets

(56) References Cited

U.S. PATENT DOCUMENTS

| | | | | |
|---|---|---|---|---|
| 5,909,790 | A | * | 6/1999 | Lohaus ................ F16D 13/646 192/213.22 |
| 6,165,074 | A | * | 12/2000 | Schraut ............ F16F 15/12386 464/64.1 |
| 6,293,383 | B1 | * | 9/2001 | Hoffmann ........... F16F 15/1238 192/204 |
| 6,520,306 | B2 | | 2/2003 | Bertrand et al. |
| 6,923,305 | B2 | | 8/2005 | Dulancy et al. |
| 2017/0152913 | A1 | * | 6/2017 | Pereira ..................... F16D 3/12 |

* cited by examiner

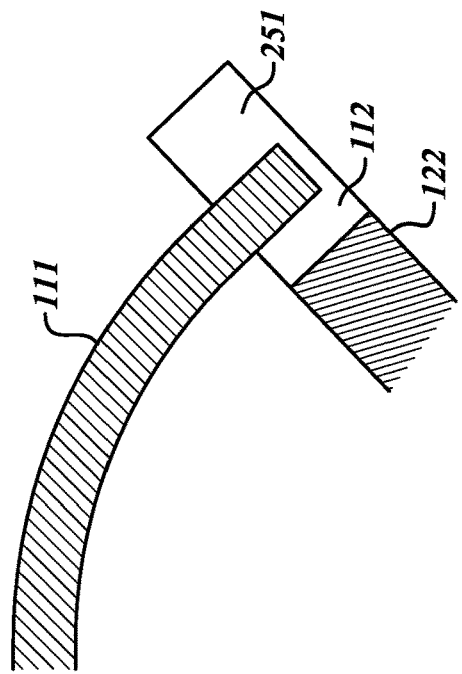
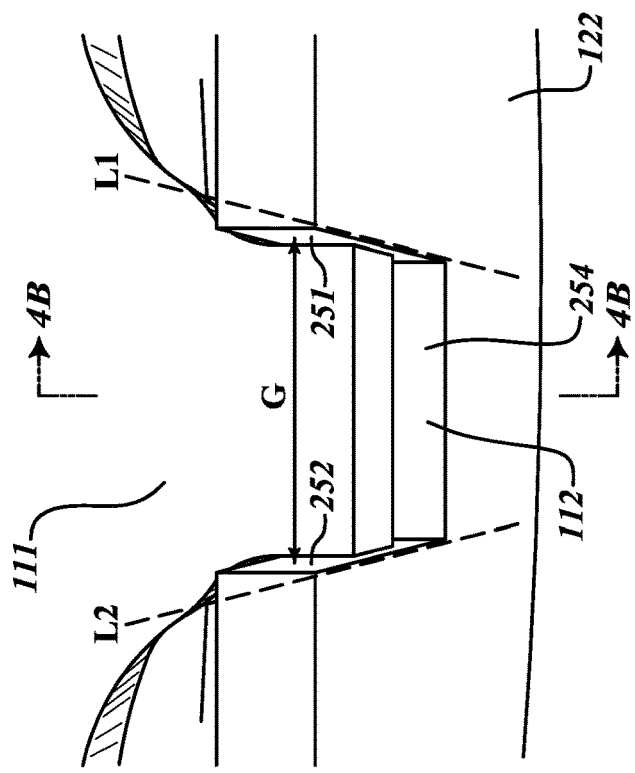
FIG. 4B
FIG. 4A

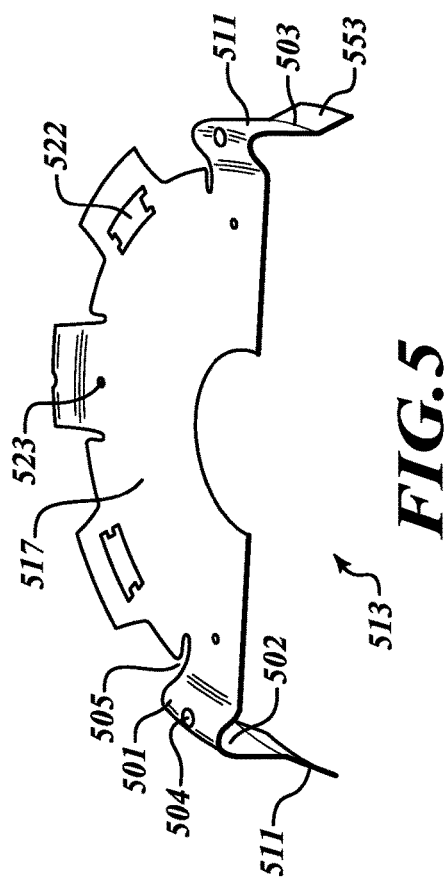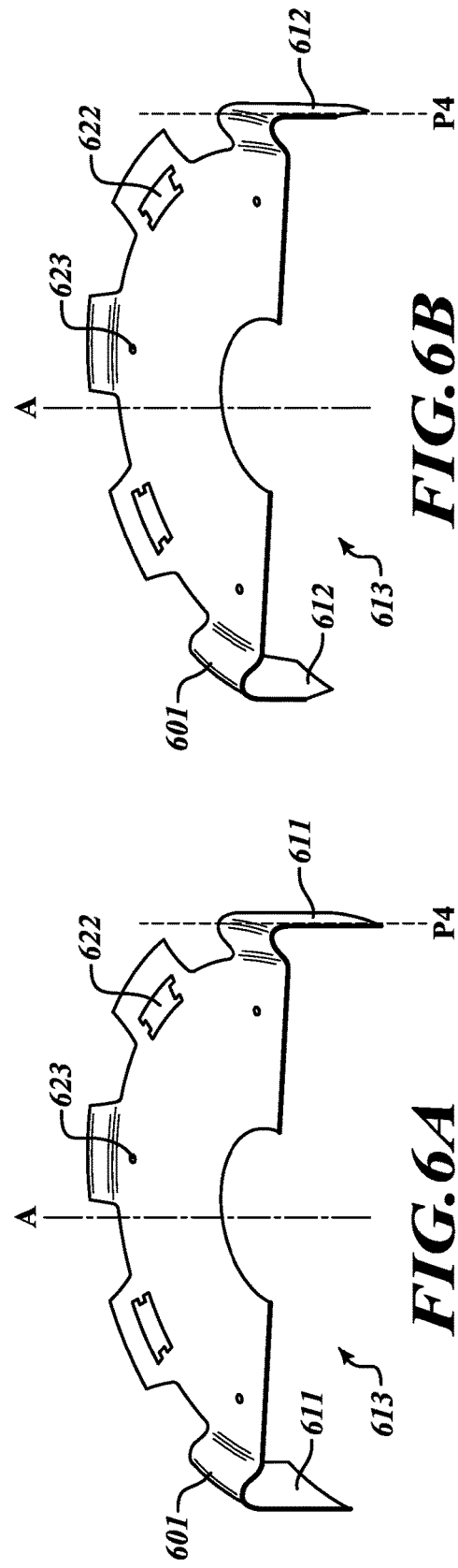

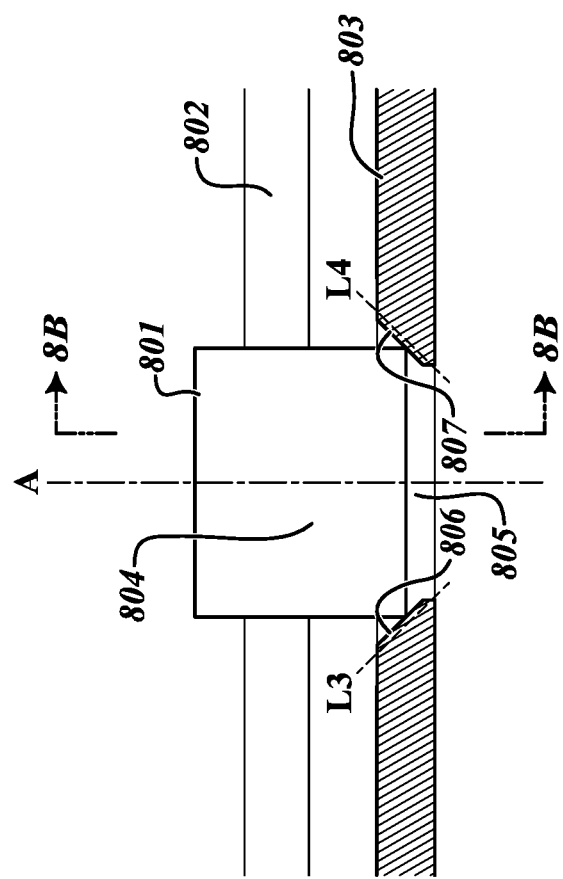

ZERO BACKLASH PRE-DAMPER TO MAIN DAMPER ATTACHMENT SYSTEM

FIELD

This application relates to damping systems wherein the pre-damper plate has zero backlash with respect to the main damper plate.

BACKGROUND

Damping systems can be part of a clutch assembly located in the powertrain of a vehicle. As part of the powertrain assembly, a flywheel or dual flywheel system can be mounted at or near the torque output or throughput mechanism of an engine to transmit torque. A clutch assembly can be mounted to selectively engage and disengage the flywheel or dual flywheel. The clutch can include a driven damper assembly, including a pre-damper assembly and a main-damper assembly.

Pre-damper assemblies can travel during low torque or idle engine operation due to clearances where the pre-damper assembly engages the main-damper assembly. Although this travel can damp certain vibrations, the same travel can create other vibrations and noise.

Unwanted noise and vibration can decrease performance and reduce the lifespan of a driven damper assembly. Noise and vibration can also make it difficult to identify the source of other vibrations and noise in a clutch assembly.

SUMMARY

The devices disclosed herein overcome the above disadvantages and improves the art by way of a driven damper assembly, comprising a pre-damper plate comprising tabs extending outwardly. A main damper cover plate comprises inclined notches for receiving the tabs.

A driven damper assembly, comprises a first main-damper cover plate comprising an inclined portion. The inclined portion comprises a notch. The driven damper assembly comprises a second main-damper cover plate comprising a first center, a first pre-damper cover plate comprising a second center, an axis passing through the first center and the second center, a plurality of torsional springs located radially about the axis, and a first plane passing through the first pre-damper cover plate. The first plane is perpendicular to the axis. The driven damper assembly comprises a second plane passing through the first main-damper cover plate. The second plane is perpendicular to the axis and parallel to the first plane. The notch comprises a first wall and a second wall. The first wall is not parallel to the second wall. The inclined portion extends away from the second plane at an angle greater than zero degrees away from the second plane and less than ninety degrees away from the second plane. The first pre-damper cover plate comprises a tab with a first portion extending outwardly at an angle greater than zero degrees away from the first plane and less than ninety degrees away from the first plane, wherein the tab engages the notch at the first wall and the second wall.

A driven damper assembly comprises a first main-damper cover plate comprising a notch. The notch comprises a first wall and a second wall. The first wall is not parallel to the second wall. The driven damper assembly further comprises a first pre-damper cover plate comprising a tab. The first pre-damper cover plate comprises a tab. The tab comprises a first bend. The tab engages the notch. An interference fit exists where the tab engages the notch. The tab deforms at the first bend, thereby causing the tab to exert a spring force against the notch.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIG. 4A is a view of an inclined tab engaged with a notch.
FIG. 4B is a view along section line 4B-4B of FIG. 4A.
FIG. 5 is a view of a pre-damper cover plate with inclined tabs.
FIG. 6A is a view of a pre-damper cover plate with rectangular tabs that are perpendicular.
FIG. 6B is a view of a pre-damper cover plate with wedge-shaped tabs that are perpendicular.
FIG. 8A is a view of a rectangular tab engaged with a v-shaped notch.
FIG. 8B is a view along line 8B-8B of FIG. 8A.

DETAILED DESCRIPTION

Reference will now be made in detail to the examples, which are illustrated in the accompanying drawings. Wherever possible, the same reference numbers will be used throughout the drawings to refer to the same or like parts. Directional references such as "left" and "right" are for ease of reference to the figures.

An engine can be affiliated with a driven damper assembly through a flywheel or dual flywheel system. The driven damper assembly can be mounted at or near the flywheel to damp vibrations. A pre-damper assembly can filter vibrations that occur during low torque or idle engine operation. Undesired travel can occur, however, in clearance zones in the pre-damper assembly or in clearance zones on the attachment mechanisms for the pre-damper assembly. The undesired travel occurring in the clearance zones can consume some of the benefits of permitted travel and can interfere with testing operations done to the assembly.

Figure 1:
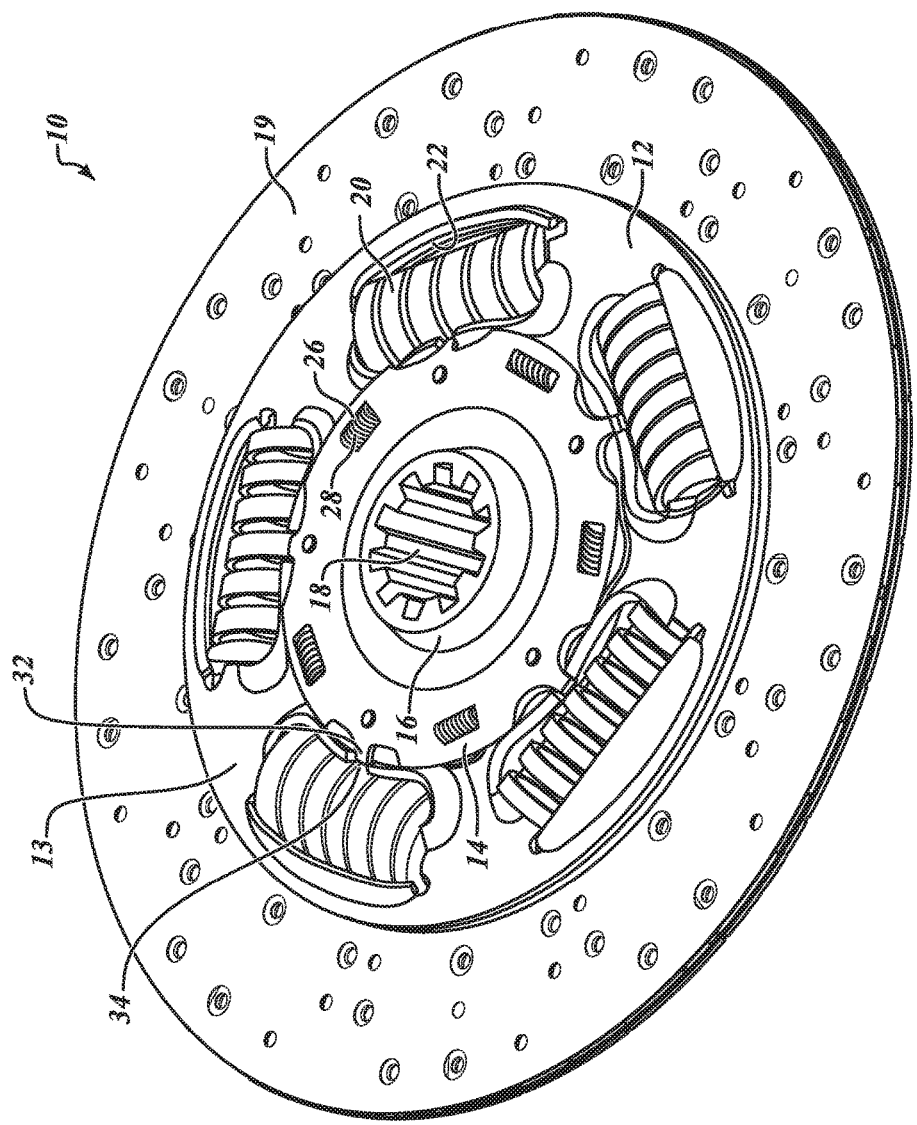
FIG. 1 is a view of a prior art driven damper assembly.

FIG. 1 shows a driven damper assembly 10 with a main damper 12 and a pre-damper 14. Pre-damper 14 can be directly attached to hub 16. Hub 16 can include a plurality of splines 18 on its inner diameter to connect to a shaft (not shown), for example, an input shaft leading to a transmission.

Automobiles and other vehicles commonly have a driven damper assembly as part of a clutch assembly in a powertrain system. The clutch assembly can be located between an engine and a transmission assembly. The engine produces torque, which can be transferred to a clutch assembly by a flywheel when the clutch assembly is engaged with the flywheel. When the clutch is disengaged from the flywheel, the clutch does not convey torque from the engine to the shaft connected to the inner diameter, such as a transmission input shaft.

A friction disc 19 can be attached to driven damper assembly 10. Friction disc 19 can receive torque from a flywheel. Friction disc 19 can transfer torque to main-damper springs 20. Torque then travels from main-damper springs 20 to the main-damper cover plates, for example, main-damper cover plate 13 on main-damper assembly 12. Main-damper cover plate 13 transfers torque to hub 16.

Torque can travel from hub 16 to a transmission assembly and then to wheels, thereby rotating the wheels and accelerating the vehicle. Torque can also travel in the reverse direction, for example, during deceleration when one engages the vehicle's brakes.

A plurality of torsion-damping mechanisms are arranged as part of the driven damper assembly 10. For example, main-damper springs 20 can be located in a plurality of main-damper spring pockets 22 on main damper 12. Main-damper springs 20 can absorb shock experienced during rapid acceleration or deceleration. Main-damper springs 20 can also damp vibrations. Pre-damper 14 can also include torsion-damping mechanisms in the form of pre-damper springs 26 located in pre-damper spring pockets 28. Pre-damper 14 can also damp vibrations, often damping vibrations occurring at lower torques.

Tab 32 can be formed on pre-damper 14. Notch 34 is located on the main damper 12. Notch 34 can receive tab 32.

Figure 2:
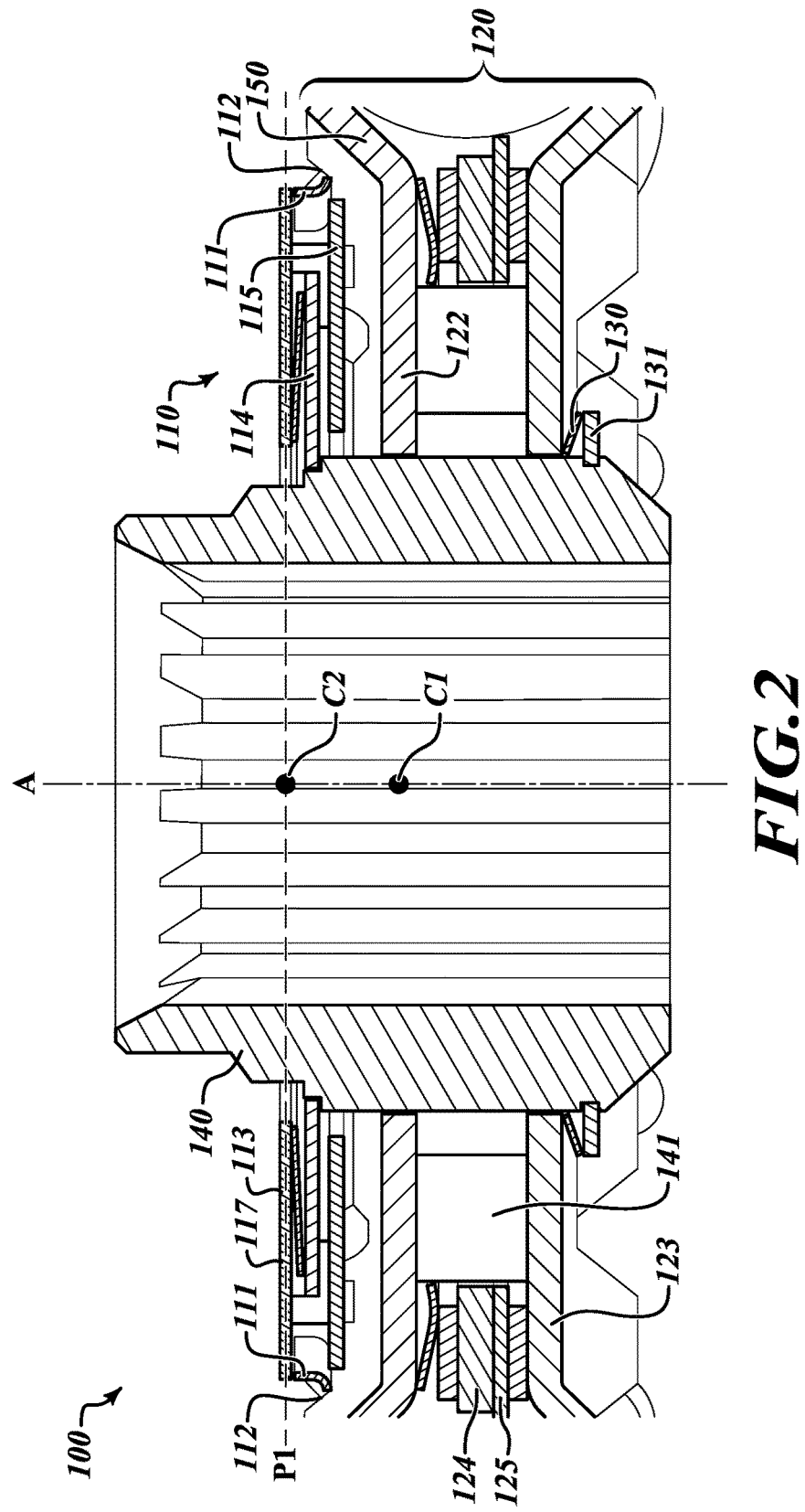
FIG. 2 is a cross-sectional view of a driven damper assembly.

FIG. 2 shows a cross-sectional view of a driven damper assembly 100. Driven damper assembly 100 can comprise a pre-damper assembly 110 and a main-damper assembly 120. Pre-damper assembly 110 can damp vibrations during low torque while also preventing backlash. Backlash can occur when clearance exists at the connection where the pre-damper assembly 110 engages the main-damper assembly 120.

When mounting the pre-damper assembly 110 with respect to the main damper assembly 120, certain parts interlock. For example, the tab 32 of the pre-damper 14 seats in a notch 34 on main-damper cover plate 13. There are several ways to couple the tab 32 in the notch 34. But, if the tab 32 has too much clearance with respect to the notch 34, the tab 32 can rattle during use and cause unwanted noise and damage to the notch 34. But, the tab 32 and notch 34 combination is also designed to permit at least some axial movement between the tab and notch. It is desirable to permit axial movement of the pre-damper 14 with respect to the main-damper cover plate 13, while minimizing the rattle between pre-damper 14 and main-damper cover plate 13.

Turning to FIG. 2, driven damper assembly 100 can be arranged such that pre-damper assembly 110 does not move in the axial direction with respect to first main-damper cover plate 122.

Pre-damper assembly 110 engages main-damper assembly 120 using tabs 111 extending from pre-damper assembly 110 and notches 112 on the first main-damper cover plate 122.

Pre-damper assembly 110 can be pressed against main-damper assembly 120 by a force exerted by biasing device 130. Biasing device can be a wave-spring, Belleville washer, or other biasing device known to one skilled in the art.

Biasing device 130 can be located between second main-damper cover plate 123 and a snap ring 131. The snap ring 131 can be attached to inner hub 140 such that the biasing device 130 pushes second main-damper cover plate 123 toward pre-damper assembly 110. This arrangement can keep pre-damper assembly 110 in contact with first main-damper cover plate 122, thereby preventing rattle, reducing heat generation, and preventing unnecessary wear.

First main-damper cover plate 122 has a first center C1 and first pre-dam per cover plate 113 has a second center C2. Axis A passes through first center C1 and second center C2. First plane P1 passes through first pre-damper cover plate 113 and is perpendicular to axis A. First pre-damper cover plate 113 can comprise a substantially planar disc portion 117 that is substantially parallel to first plane P1.

Tabs 111 are inclined away from first plane P1. Inclined portion 150 of first main-damper cover plate 122 is also inclined with respect to first plane P1. Notches 112 are located on inclined portion 150. Tabs 111 fit into notches 112 such that the force applied by biasing device 130 presses first main-damper cover plate 122 against pre-damper assembly 110. The pressing creates a spring force in the tabs 111. The tabs 111 can comprise bends, holes or slits to control the spring force.

Pre-damper assembly 110 can include pre-damper stack plate 114, which can be welded, staked, or otherwise fixed to inner hub 140. Also, in addition to the fixed pre-damper stack plate 114 or as an alternative to fixing pre-damper stack plate 114 to inner hub 140, a snap ring can be used to limit the axial movement of pre-damper stack plate 114 with respect to other parts.

Main-damper assembly 120 can include a main-damper stack plate 124 and a friction disc 125. First main-damper cover plate 122 and second main-damper cover plate 123 can be connected to outer hub 141.

Figure 3:
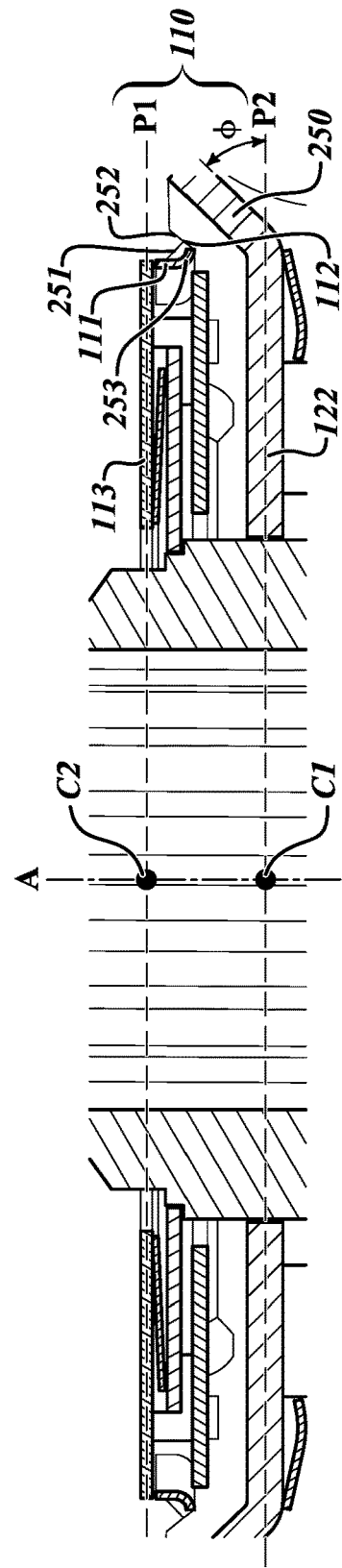
FIG. 3 is a cross-sectional view of pre-damper assembly as part of a driven damper assembly.

FIG. 3 is a cross-sectional view of pre-damper assembly 110, showing first plane P1 passing through first pre-damper cover plate 113 and second plane P2 passing through first main-damper cover plate 122. First plane P1 is parallel to second plane P2 and perpendicular to axis A.

Tab 111 has a first portion 253, which extends outwardly away from the first plane and toward the second plane at an angle greater than zero degrees away from the first plane P1 and less than ninety degrees away from the first plane P1. First portion 253 of tab 111 engages the notch 112 at the first wall 251 and the second wall 252. During operation, tab 111 can always maintain contact with first wall 251 and second wall 252 of notch 112. The spring forces designed in to the system ensure this contact.

Inclined portion 250 of first main-damper cover plate 122 extends away from the first plane P1 and away from the second plane P2. The inclined portion 250 can extend away from the second plane P2 at an angle of $\phi$, which can be greater than zero degrees away from the second plane P2 and less than ninety degrees away from the second plane P2. This inclined arrangement allows notch 112 to receive first portion 253 of tab 111 such that first portion 253 pushes against first wall 251 and second wall 252 of notch 112. The angle at which the first portion 253 extends can complement the angle $\phi$ to permit the tab 111 to seat securely against the inclined portion 250.

Notch 112 is located on inclined portion 250. Notch 112 is defined by first wall 251 and second wall 252. First wall 251 is not parallel to second wall 252. First wall 251 and second wall 252 can form a v-shape. The v-shaped arrangement allows first portion 253 of tab 111 to fit into notch 112 such that first pre-damper cover plate is prevented from moving in both the radial and axial direction with respect to first main-damper cover plate 122.

FIG. 4A is a view of tab 111 engaged with notch 112 at first wall 251 and second wall 252. Line L1 follows the contour of first wall 251 and line L2 follows the contour of second wall 252. Line L1 is not parallel to line L2 as first wall 251 is not parallel to second wall 252. In FIG. 4, first wall 251 and second wall 252 have a linear contour. The contour, however, can be curved.

Line L1 and line L2 together form a v-shape in that the gap G between first wall 251 and second wall 252 narrows as the first wall 251 and second wall 252 approach third wall 254. This arrangement allows tab 111 to engage first wall 251 and second wall 252 as tab 111 is pushed against first main-damper cover plate 122.

Tab 111 need not be v-shaped. If notch 112 is v-shaped or otherwise shaped to allow tab 111 to press against first wall 251 and second wall 252 when tab 111 is pulled against notch 112, then tab 111 can have a square or rectangular shape. Tab 111, however, can be v-shaped, trapezoid-shaped, pentagon-shaped, hexagon-shaped, or conical or otherwise shaped to improve the fit of tab 111 in notch 112.

FIG. 4B is a view along section line 4B-4B of FIG. 4A. FIG. 4B shows tab 111 engaged with notch 112. Notch 112 has a first wall 251 and is part of first main-damper cover plate 122. Tab 111 is shown as following a curved contour in FIG. 4B. One can modify the contour of tab 111 as desired. For example, one skilled in the art can create a bend or bends in tab 111 as shown in FIGS. 5, 6A, and 6B.

The arrangements above can prevent backlash from occurring both during operation and testing. A driven damper assembly with zero-backlash reduces the overall rattle or chatter. It also reduces vibrations. This can improve the performance of the driven damper assembly and extend its life. During testing, rattle and vibrations can make it more difficult to identify other causes of vibrations and rattle experienced by a clutch assembly. Using driven damper assemblies described above can eliminate vibrations and rattle caused by clearances where the pre-damper assembly engages the main-damper assembly, thereby improving the testing process.

FIG. 2 shows a pre-damper assembly 110 connected to a main-damper assembly 120. Biasing device 130 can push main-damper assembly 120 toward first pre-damper cover plate 113 such that tabs 111 fit tightly in notches 112. As an alternative to using biasing device 130 to assist in achieving a tight fit between tabs 111 and notches 112, one can apply a spring force using tabs 111 such that tabs 111 push main-damper assembly 120 toward snap ring 131. The spring force can eliminate the need for biasing device 130. Also, the spring force can be used with biasing device 130, for example, to increase the force tabs 111 exert on notches 112.

FIG. 5 shows a view of a first pre-damper cover plate 513 with pre-damper spring pockets 522, rivet holes 523, and tabs 511. Tabs 511 each have a first bend 501. First bend 501 can provide a spring force sufficient to create a tight fit between tabs 511 and notches in a main-damper assembly, for example, notches 112 shown in FIG. 2. First bend 501 allows second portion 502 to deform when pressed against a notch. This deformation results in tabs 511 exerting a spring force on the notch. Tabs 511 can have multiple bends, including second bend 503. Second bend 503 allows first portion 553 to deform when pressed against a notch. One skilled in the art can select the number of bends based on the desired spring force.

When an arrangement like the one shown in FIG. 2 is used, the fixed position of the pre-damper stack plate 114 and snap ring 131 on inner hub 140 allows tabs 111 to apply a spring force against notches 112 because the axial position of first pre-damper cover plate 113 is limited by the fixed position of pre-damper stack plate 114. For example, first pre-damper cover plate 113 can only move a certain axial distance away from pre-damper stack plate 114 because pre-damper stack plate 114 is located between first pre-damper cover plate 113 and second pre-damper cover plate 115 and pre-damper stack plate 114 is riveted, bolted, or otherwise connected to second pre-damper cover plate 115.

Snap ring 131 can be fixed to inner hub 140 such that the axial motion of first main-damper cover plate 122 is limited relative to snap ring 131. With pre-damper stack plate 114 and snap ring 131 being fixed to inner hub 140, a spring force applied by tabs 11 on notches 112 can push first main-damper cover plate 122 toward snap ring 131. When first main-damper cover plate 122 reaches a position where it can no longer move toward snap ring 131, tabs 111 can deform, thereby exerting a spring force on notches 112.

FIG. 5 shows other elements that can affect the amount of spring force exerted. For example, first hole 504 can be located on first bend 501. First hole 504 can change the stiffness of tabs 511 to achieve a desired spring load. Likewise, multiple holes can be located on first bend 501 to change the stiffness of tabs 511. One skilled in the art can make other modifications to tabs 511 and first pre-damper cover plate 513 to change the stiffness to achieve the desired spring load. For example, first pre-damper cover plate 513 can have a slit 505 located on substantially parallel disc portion 517 and adjacent to tab 511, for example, near first bend 501.

FIG. 6A shows a view a first pre-damper cover plate 613 comprising pre-damper spring pockets 622, rivet holes 623, and tabs 611. Each of tabs 611 can have a first bend 601. In this arrangement tabs 611 need not be inclined. Plane P4, passing through tabs 611, can be parallel to axis A. Also, plane P4 can be, but need not be, inclined with respect to axis A.

When tabs 611 are pressed against a notch, first bend 601 can deform, thereby creating a spring force. The spring force can create an interference fit between tabs 611 and the notch. Like first pre-damper cover plate 513 shown in FIG. 5, first pre-damper cover plate 613 can be modified to achieve a desired spring load, for example, by adding holes or slits to first bend 601, tabs 611, or other areas of first pre-damper cover plate 613.

FIG. 6B shows a view of a first pre-damper cover plate 613 comprising pre-damper spring pockets 622, rivet holes 623 and wedge-shaped tabs 612. Wedge-shaped tabs 612 can fit into a rectangular slot, where the walls of the slot are parallel to one another. The walls of the slot need not be v-shaped or arranged in a way not parallel to one another because the wedge-shape (or v-shape) ensure that the tabs fit against the walls of the slot. One skilled in the art can modify the wedge-shape to achieve the desired fit of tabs 612. Tabs 612 can be pressed against the walls of the slot by a spring force created by a bend or a biasing device as described above.

Figure 7:
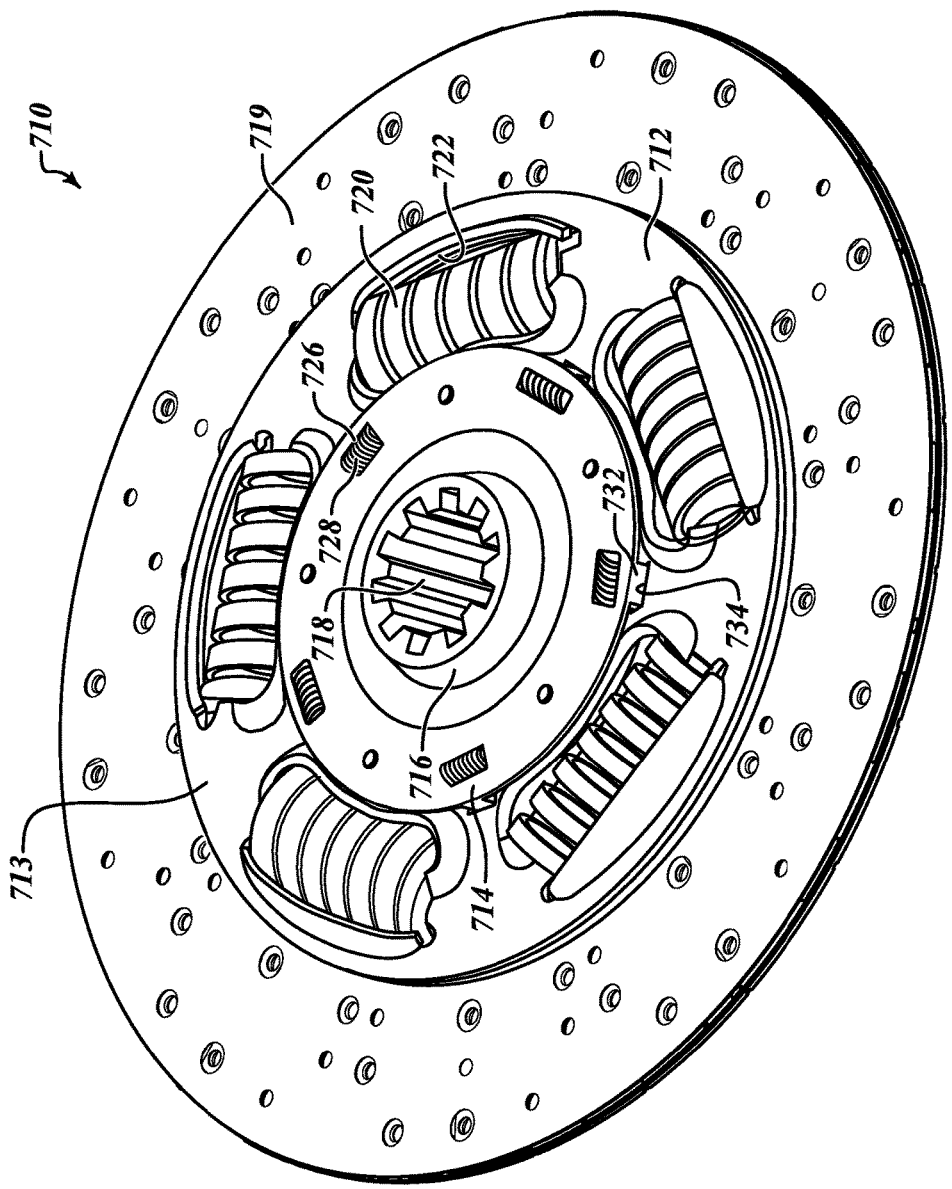
FIG. 7 is a view of a driven damper assembly with perpendicular tabs on a pre-damper cover plate.

FIG. 7 shows first pre-damper cover plate 714 connected to first-main damper cover plate 713 with notches 734 that are located on a flat portion of the first main-damper cover plate 713. This is one example of how a first pre-damper cover plate like first pre-damper cover plate 613 shown in FIGS. 6A and 6B can fit onto a main damper cover plate. Although tabs 611 on first pre-damper cover plate 613 of FIG. 6A can fit into the notches 34 as shown in FIG. 1 located near the middle of torsional springs 20 on an inclined portion of a first main-damper cover plate, tabs 611 can also fit into notches that are located on a flat portion of a first main-damper cover plate.

First pre-damper cover plate 714 comprises tabs 732 that engage notches 734 on first main-damper cover plate 713. In this arrangement, notches need not be located on an inclined portion of first main-damper cover plate 713. And tabs 732 can be perpendicular to first main-damper cover plate 713. Like the arrangement in FIG. 1, the driven damper assembly 710, first pre-damper cover plate 714 can be directly attached to hub 716. Hub 716 can include a plurality of splines 718 on its inner diameter to connect to a shaft (not shown), for example, a shaft leading to a transmission.

A friction disc 719 can be attached to driven damper assembly 710. Friction disc 719 can receive torque from a flywheel. Friction disc 719 can transfer torque to main-damper springs 720. Torque then travels from main-damper springs 720 to the main-damper cover plates, for example, first main-damper cover plate 713 on main-damper assembly 712. First main-damper cover plate 713 transfers torque to hub 716.

Torque can travel from hub 716 to a transmission assembly and then to wheels, thereby rotating the wheels and accelerating the vehicle. Torque can also travel in the reverse direction, for example, during deceleration when one engages the vehicle's brakes.

A plurality of torsion-damping mechanisms are distributed around axis A to damp torsional vibrations. The torsion-damping mechanisms can comprise, for example, a plurality of main-damper springs 720 located in a plurality of main-damper spring pockets 722 on main damper assembly 712. First pre-damper cover plate 714 can include pre-damper springs 726 located in pre-damper spring pockets 728. The main-damper springs 720 and pre-damper springs 736 perform similarly to other depicted torsion-damping mechanisms of FIG. 1 and can be selected in kind and number based on the torque application.

FIG. 8A shows a view of one of example of how the tabs on the first pre-damper cover plates shown in FIGS. 6 and 7 can engage a notch on a main-damper cover plate. Tab 804 can be parallel to axis A. Tab 804 can engage notch 805 at first wall 806 and second wall 807. First wall 806 can have a contour L3 that is not parallel to the contour L4 of second wall 807. Here, contours L3, L4 are linear, but they can be curved. The v-shaped arrangement of first wall 806 and second wall 807 with respect to tab 804 allows tab 804 to engage notch 805 in such a manner that first pre-damper cover plate 802 does not move in either the radial or axial direction with respect to first main-damper cover plate 803.

First bend 801, when deformed, creates a spring force that results in an interference fit where tab 804 contacts first wall 806 and second wall 807. First bend 801 can deform for the same reasons explained above, for example, when discussing how the bends in FIG. 5 can create a spring load. Likewise, one can modify first bend 801 to achieve a desired spring load, for example, by adding holes or slits to first bend 801, tab 804, or other areas of first pre-damper cover plate 802.

FIG. 8B is a view along section line 8B-8B of FIG. 8A. FIG. 8B shows tab 804 engaged with second wall 807. Tab 804 is part of first pre-damper cover plate 802. Second wall 807 and is part of first main-damper cover plate 803. Second wall 807 can be angled as shown in FIG. 8A. First bend 801 can provide a spring force when tab 804 is pressed against second wall 807.

Other implementations will be apparent to those skilled in the art from consideration of the specification and practice of the examples disclosed herein. It is intended that the specification and examples be considered as exemplary only, with the true scope of the invention being indicated by the following claims.

What is claimed is:

1. A driven damper assembly, comprising:
    a first main-damper cover plate comprising a first center and an inclined portion, wherein the inclined portion comprises a notch;
    a first pre-damper cover plate comprising a second center;
    an axis passing through the first center and the second center;
    a plurality of torsion-damping mechanisms located radially about the axis;
    a first plane passing through the first pre-damper cover plate, wherein the first plane is perpendicular to the axis;
    a second plane passing through the first main-damper cover plate, wherein the second plane is perpendicular to the axis and parallel to the first plane;
    wherein the notch comprises a first wall and a second wall, wherein the first wall is not parallel to the second wall;
    wherein the inclined portion extends away from the first plane and the second plane at an angle greater than zero degrees away from the second plane and less than ninety degrees away from the second plane;
    wherein the first pre-damper cover plate comprises a tab comprising a first portion, wherein the first portion extends outwardly away from the first plane and towards the second plane at an angle greater than zero degrees away from the first plane and less than ninety degrees away from the first plane, wherein the tab engages the notch at the first wall and the second wall.

2. The driven damper assembly of claim 1, further comprising a biasing device, wherein the biasing device pushes the tab against the first wall and the second wall of the notch.

3. The driven damper assembly of claim 2, wherein the biasing device is a wave spring.

4. The driven damper assembly of claim 2, wherein the first pre-damper cover plate does not move in the axial direction with respect to the first main-damper cover plate.

5. The driven damper assembly of claim 2, wherein the first pre-damper cover plate does not move in the radial direction with respect to the first main-damper cover plate.

6. The driven damper assembly of claim 2, wherein the first portion of the tab is trapezoid-shaped.

7. The driven damper assembly of claim 2, wherein the first portion of the tab is v-shaped.

8. The driven damper assembly of claim 2, wherein the driven damper assembly experiences zero backlash during operation.

9. The driven damper assembly of claim 1, wherein the tab exerts a spring force on the notch.

10. The driven damper assembly of claim 9, wherein the tab comprises a first bend to control the spring force.

11. The driven damper assembly of claim 10, wherein the tab comprises a first hole in the first bend.

12. The driven damper assembly of claim 9, wherein the tab comprises a first bend and a second bend to control the spring force.

13. The driven damper assembly of claim 12, wherein the first pre-damper cover plate comprises a disc portion and a slit on the disc portion, and wherein the slit is adjacent to the tab.

14. The driven damper assembly of claim 1, comprising at least two snap rings positioned to impart a spring force in the tab against the notch.

15. A driven damper assembly, comprising:
- a first main-damper cover plate comprising a notch, wherein the notch comprises a first wall and a second wall, wherein the first wall is not parallel to the second wall;
- a first pre-damper cover plate comprising a tab, wherein the tab comprises a first bend and a second bend;
- wherein the tab engages the notch and wherein an interference fit exists where the tab engages the notch,
- wherein the tab deforms at the first bend, thereby causing the tab to exert a spring force against the notch,
- wherein the first main-damper cover plate covers a plurality of torsion-damping mechanisms, and
- wherein the first pre-damper cover plate covers a plurality of pre-damper torsion-damping mechanisms.

16. The driven damper assembly of claim 15, further comprising: a main-damper stack plate; and
- a friction disc, wherein the friction disc is connected to the main-damper stack plate.

17. The driven damper assembly of claim 15, further comprising a snap ring for securing the spring force.

18. The driven damper assembly of claim 15, wherein the first pre-damper cover plate does not move in the axial direction with respect to the first main-damper cover plate.

19. The driven damper assembly of claim 15, wherein the first pre-damper cover plate does not move in the radial direction with respect to the first main-damper cover plate.

20. The driven damper assembly of claim 15, wherein the first portion of the tab is one of trapezoid-shaped, pentagon-shaped, v-shaped, or conical-shaped.

21. The driven damper assembly of claim 15, wherein the driven damper assembly experiences zero backlash during operation.

22. A driven damper assembly, comprising:
- a first main-damper cover plate comprising a notch, wherein the notch comprises a first wall and a second wall, wherein the first wall is not parallel to the second wall;
- a first pre-damper cover plate comprising a tab, wherein the tab comprises a first bend, wherein the tab engages the notch, and wherein an interference fit exists where the tab engages the notch; and
- a snap ring adjacent a biasing device configured to exert a force on the tab by pushing the first man-damper cover plate towards the first pre-damper cover plate,
- wherein the tab deforms at the first bend, thereby causing the tab to exert a spring force against the notch,
- wherein the first main-damper cover plate covers a plurality of torsion-damping mechanisms, and
- wherein the first pre-damper cover plate covers a plurality of pre-damper torsion-damping mechanisms.

* * * * *